United States Patent
Marx et al.

(10) Patent No.: US 9,718,242 B2
(45) Date of Patent: Aug. 1, 2017

(54) SEMI-IPN POLYURETHANE/POLYUREA PROTECTIVE FILMS

(71) Applicant: 3M INNOVATIVE PROPERTIES COMPANY, St. Paul, MN (US)

(72) Inventors: Ryan F. Marx, Rosemount, MN (US); Gerald F. Fleischhacker, White Bear Lake, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 248 days.

(21) Appl. No.: 14/558,431

(22) Filed: Dec. 2, 2014

(65) Prior Publication Data

US 2015/0084233 A1  Mar. 26, 2015

Related U.S. Application Data

(63) Continuation-in-part of application No. 12/367,146, filed on Feb. 6, 2009, now Pat. No. 8,916,271.
(Continued)

(51) Int. Cl.
*B29C 70/78* (2006.01)
*C08J 3/24* (2006.01)
(Continued)

(52) U.S. Cl.
CPC .............. *B29C 70/78* (2013.01); *C08J 3/246* (2013.01); *C09J 7/0282* (2013.01); *C09J 175/02* (2013.01);
(Continued)

(58) Field of Classification Search
None
See application file for complete search history.

(56) References Cited

U.S. PATENT DOCUMENTS

| | | | |
|---|---|---|---|
| 4,232,494 A | 11/1980 | Bauch | |
| 4,302,553 A * | 11/1981 | Frisch | .................. C08G 83/00 525/100 |

(Continued)

FOREIGN PATENT DOCUMENTS

| | | |
|---|---|---|
| WO | WO 98/33845 | 8/1998 |
| WO | WO 99/19414 | 2/1999 |

(Continued)

OTHER PUBLICATIONS

"Semi-Interpenetrating Polymer Network", IUPAC Gold Book, retrieved on May 29, 2013.
(Continued)

*Primary Examiner* — Edmund Lee
(74) *Attorney, Agent, or Firm* — Philip P. Soo

(57) ABSTRACT

Briefly, the present disclosure provides a film, tape or outer layer of a composite part comprising: a) at least one layer comprising a crosslinked polymer selected from the group consisting of crosslinked polyurethane, crosslinked polyurea, and crosslinked mixed polyurethane/polyurea polymer; and in some embodiments b) an adhesive layer. In some embodiments the layer additionally comprises a non-crosslinked polymer forming a semi-IPN with the crosslinked polymer. In some embodiments the non-crosslinked polymer may be selected from the group consisting of polyurethane, polyurea, and mixed polyurethane/polyurea polymer. In some embodiments the crosslinked polymer may additionally comprise an acrylate-containing component.

9 Claims, 2 Drawing Sheets

Related U.S. Application Data

(60) Provisional application No. 61/027,177, filed on Feb. 8, 2008.

(51) Int. Cl.

| | | |
|---|---|---|
| *C09J 7/02* | (2006.01) | |
| *C09J 175/02* | (2006.01) | |
| *C09J 175/04* | (2006.01) | |
| C08L 33/00 | (2006.01) | |
| C08L 75/04 | (2006.01) | |
| B29K 75/00 | (2006.01) | |
| B29K 105/06 | (2006.01) | |
| B29K 105/24 | (2006.01) | |

(52) U.S. Cl.
CPC ......... *C09J 175/04* (2013.01); *B29K 2075/00* (2013.01); *B29K 2105/06* (2013.01); *B29K 2105/24* (2013.01); *C08G 2170/40* (2013.01); *C08G 2270/00* (2013.01); *C08L 33/00* (2013.01); *C08L 75/04* (2013.01); *C09J 2433/006* (2013.01); *C09J 2475/006* (2013.01); *Y10S 525/903* (2013.01); *Y10T 428/28* (2015.01); *Y10T 428/2848* (2015.01); *Y10T 428/31551* (2015.04)

(56) References Cited

U.S. PATENT DOCUMENTS

| | | | |
|---|---|---|---|
| 4,859,742 A * | 8/1989 | Pattein | C08F 299/06 522/135 |
| 4,948,859 A * | 8/1990 | Echols | C08G 18/0895 264/211.23 |
| 5,008,142 A * | 4/1991 | Wilson | C09D 201/00 359/536 |
| 5,089,364 A | 2/1992 | Lee et al. | |
| 5,709,948 A | 1/1998 | Perez et al. | |
| 5,754,338 A * | 5/1998 | Wilson | B29C 65/608 359/529 |
| 5,959,775 A * | 9/1999 | Joseph | C08G 18/10 359/536 |
| 5,965,256 A | 10/1999 | Barrera | |
| 6,001,936 A | 12/1999 | Barrera et al. | |
| 6,013,210 A | 1/2000 | Gardner, Jr. | |
| 6,022,925 A | 2/2000 | Tomko | |
| 6,054,007 A | 4/2000 | Boyd | |
| 6,395,844 B1 | 5/2002 | Barrera et al. | |
| 6,399,199 B1 | 6/2002 | Fujino et al. | |
| 7,157,527 B2 | 1/2007 | Kuntimaddi et al. | |
| 7,265,178 B2 | 9/2007 | Maier et al. | |
| 8,096,508 B2 | 1/2012 | Marx et al. | |
| 8,552,091 B2 | 10/2013 | Barker et al. | |
| 2003/0108700 A1 * | 6/2003 | Krech | B65D 19/0012 428/35.7 |
| 2004/0194877 A1 | 10/2004 | Gupta et al. | |
| 2006/0182949 A1 | 8/2006 | Salnikov | |
| 2007/0231569 A1 | 10/2007 | Tanaka et al. | |
| 2008/0209981 A1 | 9/2008 | Daniels et al. | |
| 2009/0039200 A1 | 2/2009 | Marx et al. | |

FOREIGN PATENT DOCUMENTS

| | | |
|---|---|---|
| WO | WO 99/67311 | 12/1999 |
| WO | WO 2006/118883 | 11/2006 |
| WO | WO 2009/023424 | 2/2009 |

OTHER PUBLICATIONS

"Interpenetrating Polymer Networks", Encyclopedia of Polymer Science and Technology, Published online on Mar. 15, 2004, John Wiley & Sons, vol. 10, pp. 272-311.

Vilas D. Athawale et al., "Recent Developments in Polyurethanes and Poly(acrylates) Interpenetrating Polymer Networks", 2003, Journal of Macromolecular Science, vol. C43, No. 1, pp. 1-26, 2003.

\* cited by examiner

SEMI-IPN POLYURETHANE/POLYUREA PROTECTIVE FILMS

CROSS REFERENCE TO RELATED APPLICATION

This application is a divisional of U.S. application Ser. No. 12/367,146, filed Feb. 6, 2009, now allowed, now U.S. Pat. No. 8,916,271, which claims priority to U.S. Application No. 61/027,177, filed Feb. 8, 2008, the disclosures of which are incorporated by reference herein in their entirety.

FIELD OF THE DISCLOSURE

This invention relates to polyurethane or polyurea tapes and films which include a semi-interpenetrating polymer network (semi-IPN) and their use in surface protection, including protection of aircraft surfaces from erosion due to water and particles such as sand and dust.

SUMMARY OF THE INVENTION

Briefly, the present disclosure provides a film or tape comprising: a) at least one layer comprising a crosslinked polymer selected from the group consisting of crosslinked polyurethane, crosslinked polyurea, and crosslinked mixed polyurethane/polyurea polymer; and b) an adhesive layer. In some embodiments the layer additionally comprises a non-crosslinked polymer forming a semi-IPN with the crosslinked polymer. In some embodiments the non-crosslinked polymer may be selected from the group consisting of polyurethane, polyurea, and mixed polyurethane/polyurea polymer. In some embodiments the crosslinked polymer may additionally comprise an acrylate-containing component.

In another aspect, the present disclosure provides a construction comprising a film or tape as provided herein bound by an adhesive layer to a surface of a composite part or metal part.

In another aspect, the present disclosure provides a composite part comprising a resin matrix and an outer surface layer differing in composition from the resin matrix, where the outer surface comprises at least one layer comprising a crosslinked polymer selected from the group consisting of crosslinked polyurethane, crosslinked polyurea, and crosslinked mixed polyurethane/polyurea polymer. In some embodiments the layer additionally comprises a non-crosslinked polymer forming a semi-IPN with the crosslinked polymer. In some embodiments the non-crosslinked polymer may be selected from the group consisting of polyurethane, polyurea, and mixed polyurethane/polyurea polymer. In some embodiments the crosslinked polymer may additionally comprise an acrylate-containing component.

DETAILED DESCRIPTION

Figure 1:
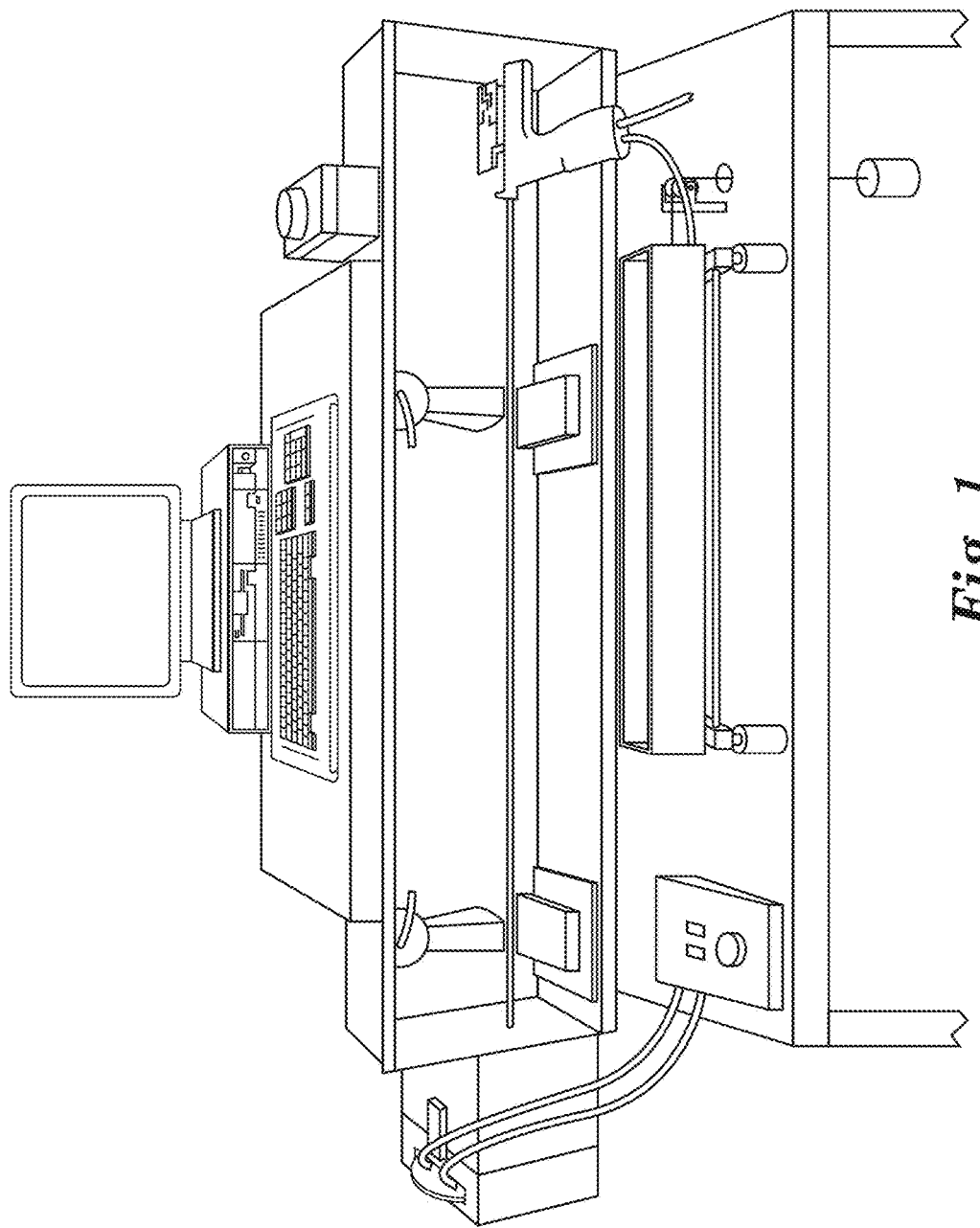
FIG. 1 is a schematic of the apparatus used to test for rain erosion resistance, as described in the Examples and in U. S. Published Patent App. No. 2008/0209981-A1, published on Sep. 4, 2008, the disclosure of which is incorporated herein by reference.

The present disclosure provides polyurethane or polyurea tapes and films which include a semi-interpenetrating polymer network (semi-IPN) and their use in surface protection, including protection of aircraft surfaces from erosion due to water and particles such as sand and dust. Also covered is the ability to protect surfaces, not limited to aircraft, that are subjected to elevated temperatures in use or during manufacture. The crosslinked component of the semi-IPN may be comprised of a urethane (or urea) acrylate oligomer that is crosslinked to form a network within the non-crosslinked component. The non-crosslinked component may be a thermoplastic polyurethane/polyurea, which is chemically distinct from the crosslinked component.

In some embodiments, protective tapes and films disclosed in this invention can be used to protect surfaces of aircraft including leading edges of wings, radomes, and helicopter rotors from damage due to water, sand, dust, or debris. The semi-IPN polyurethane of the present invention can offer better erosion resistance than a thermoplastic polyurethane alone. A tape with a pressure sensitive adhesive offers a simple way of applying the film to the aircraft and makes repairs easy. The film alone can withstand temperatures not possible with thermoplastic films, allowing the film to be co-cured into composite structures. The extent of crosslinking of the polyurethane/polyurea can be varied, allowing for a solvent resistant film or one that is removable with solvents yet still has elevated temperature capabilities. A lower extent of crosslinking can also result in a film that has integrity at high temperatures, yet has the ability to be thermoformed. A higher extent of crosslinking can prevent thermoforming from being possible.

Protective films and tapes of this invention also have utility for protecting non-aircraft surfaces that are subjected to heat either in service or during the manufacturing process. Sporting good, automotive, tool, cooking or heating equipment and general industrial applications are potential avenues for this film or tape where either processing temperatures or in-use temperatures are elevated and would require a film that can withstand elevated temperatures.

The disclosures of the following references are incorporated herein by reference: U.S. patent application Ser. No. 11/837,293, filed Aug. 10, 2007; U.S. Pat. No. 5,959,775; U.S. Pat. No. 4,948,859; U.S. Pat. No. 4,859,742; and U.S. Pat. No. 4,302,553.

Some embodiments comprise a film or tape that comprises at least one layer comprising a crosslinked polymer selected from the group consisting of crosslinked polyurethane, crosslinked polyurea, and crosslinked mixed polyurethane/polyurea polymer and an adhesive layer. Any suitable crosslinked polyurethane or crosslinked polyurea may be used. Suitable polyurethanes may include polymers of polyisocyanates and polyols. Suitable polyureas may include polymers of polyisocyanates and polyamines. In some embodiments, the crosslinked polymer may be a mixed polyurethane/polyurea polymer derived from polyisocyanates and a mixture of polyols and polyamines. Any suitable polyisocyanates, polyols or polyamines may be used. Suitable polyisocyanates may include aromatic isocyanates, aliphatic isocyanates, polyisocyanates, or combinations thereof. Suitable aromatic isocyanates may include Methylene diphenyl diisocyanate, 1,4-Phenylene diisocyanate, 1,3-Phenylene diisocyanate, 3,3'-Dimethyl diphenylmethane-4,4'-diisocyanate, Diphenylmethane-2,2'-diisocyanate, naphthalene diisocyanate, 4,4'-Biphenyldiisocyanate, 1,5-Naphthalene Diisocyanate, 2-Methyl-1,5-naphthalene diisocyanate, 2,4-toluene diisocyanate and 2,6-toluene diisocyanate and mixtures of the two isomers, diphenylmethane-2,4'-diisocyanate, 4-Ethyl-m-phenylenediisocyanate, and the like, or mixtures thereof. Suitable aliphatic isocyanates may include 2,4,4-Trimethylhexamethylene diisocyanate, 2,2,4-Trimethylhexamethylene diisocyanate, 1,4-Cyclohexane diisocyanate, 1,3-cyclohexyl diisocyanate, Trimethylhexamethylene diisocyanate, Isophorone Diisocyanate (IPDI), Decamethylene diisocyanate, Methylene diisocyanate, Methylene-bis(4-Cyclohexylisocyanate) (H12MDI), dimethyl diisocyanate, trans-1,4-Cyclohexane diisocyanate, hexamethylene diisocyanate, and the like, or mixtures thereof. Other suitable isocyanates may include polyisocyanates, including those based on any of the above. Suitable polyols may include polyester polyols, polycaprolactone polyols, polyether polyols, hydroxyl terminated polybutadiene and hydrogenated polybutadiene polyols, polycarbonate polyols, and the like, or mixtures thereof. Suitable polyamines may include JEFFAMINE® polyetheramines and the like, or mixtures thereof. In addition, chain extenders may be included, which are typically monomeric or low molecular weight difunctional compounds. Suitable hydroxy chain extenders may include ethylene glycol, diethylene glycol, propylene glycol, dipropylene glycol, neopentyl glycol, 1,4 butanediol, and 2-methyl-1,3-propylenediol and the like, or mixtures thereof. Suitable amino chain extenders may include 1,4 diaminobutane, Ethylenediamine, 1,2 diaminopropane, 1,3 diaminopropane, 1,2 diaminocyclohexane, isophorone diamine, secondary cycloaliphatic diamines, diethyltoluenediamine, and the like, or mixtures thereof.

In some embodiments, the crosslinked polymer may additionally comprise an acrylate component. The acrylate component is derived from any suitable acrylate component precursor, which is any suitable monomer, oligomer or polymer with an acrylate double bond available for polymerization. In some embodiments, acrylate component precursors are crosslinked by e-beam or other radiation during formation of the tape to form the acrylate component ultimately present in the finished tape.

In some embodiments, the acrylate component precursor is copolymerized into the polyurethane or polyurea prior to crosslinking of the acrylate component precursor. Suitable acrylates of this type, such as SR495B, include one or more groups which polymerize with the polyurethane or polyurea, such as alcohol or amine groups, and one or more acrylate double bonds available for polymerization. Other suitable species may include caprolactone acrylates, hydroxyethyl acrylate, dipentaerythritol pentaacrylate, and the like, or mixtures thereof.

In some embodiments, the acrylate component precursor is blended with the polyurethane or polyurea prior to crosslinking of the acrylate component precursor. In this embodiment, the polyurethane or polyurea form a semi-interpenetrating polymer network with the crosslinked acrylate component in the final tape. A semi-interpenetrating polymer network is formed where the acrylate-containing component is crosslinked and the other polyurethane or polyurea is not. Suitable acrylates of this type include CN996, CN9893, and the like, including such acrylates available from Sartomer. Suitable acrylates of this type are typically at least partially miscible in the polyurethane or polyurea.

The crosslinked polymer may be crosslinked by any suitable means, including radiation crosslinking, such as by e-beam, UV, visible light, IR, and the like, or covalent crosslinking achieved by the inclusion of crosslinking agents or polyfunctional monomers in the polymer during manufacture. Polyfunctional monomers may include polyisocyanates, polyols, polyamines, and the like, or mixtures thereof.

The tape or film is typically transparent or translucent but may also be pigmented. The tape may have any suitable thickness. Typical thickness is between 0.01 mm and 3.0 mm, more typically between 0.01 mm and 1.0 mm, more typically between 0.1 mm and 1.0 mm, more typically between 0.25 mm and 1.0 mm, and more typically between 0.25 mm and 0.75 mm.

Any suitable adhesive layer may be used. In one embodiment, the adhesive layer may comprise an acrylic adhesive. In one embodiment, the adhesive is a pressure-sensitive adhesive. In one embodiment, the adhesive is a structural adhesive. In one embodiment, the adhesive is two-part adhesive. In one embodiment, the adhesive is a energy-cured adhesive. In one embodiment, the adhesive is a air cured adhesive. Suitable adhesives may include acrylics, polyurethanes, silicones, styrene-butadiene block copolymers, styrene-isoprene block copolymers, epoxies, cyanoacrylates, two-part urethane, and the like.

The tape may be made by any suitable method, including those demonstrated in the Examples below. Suitable methods may include blending of polyurethane or polyurea component with a crosslinkable component, reactive extrusion or reactive coating.

The use of fiber reinforced resin matrix or fiber reinforced plastic (FRP) matrix composite laminates ("composites") has become widely accepted for the variety of applications in aerospace, automotive and other transportation industries because their light weight, high strength and stiffness. Weight reduction benefits and performance enhancements are the biggest drivers behind implementation of fiber reinforced resin matrix composite laminates into industrial applications. Various airspace components being manufactured from fiberglass and carbon fibers reinforced composites including airplane fuselage sections and wing structures. Composites are used to fabricate many parts for airplanes, wind generators, automobiles, sporting goods, furniture, buses, trucks, boats, train cars and other applications where stiff, light-weight materials, or consolidation of parts are beneficial. Most often the fibers are made of carbon, glass, ceramic or aramid, and the resin matrix is an organic thermosetting or thermoplastic material. These parts are typically manufactured under vacuum and/or pressure at temperatures from 0° C. to 180° C. and occasionally up to 230° C. In some embodiments a film or tape according to the present disclosure may be adhered to such a composite part.

In some embodiments a film or tape according to the present disclosure may be use to line a mold used to form a part, such that after the molding process the resulting part has an outer surface of the film or tape. In some embodiments such a part is a composite part. Any suitable molding process may be used, including molding of polymers, composites, fiberglass, and the like. The present disclosure includes a molded part having an outer layer which includes in whole or in part a film or tape according to the present disclosure. The molded part may be of any suitable molded material, including thermoplastic polymers, thermoset polymers, curable polymers, composites, fiberglass, ceramics, clays, and the like.

Objects and advantages of this invention are further illustrated by the following examples, but the particular materials and amounts thereof recited in these examples, as well as other conditions and details, should not be construed to unduly limit this invention.

EXAMPLES

The following Examples demonstrate manufacture of semi-IPN polyurethane tapes are made and demonstrate improved durability of these tapes over a comparable thermoplastic polyurethane tape. Two semi-IPN polyurethane tapes were made.

Unless otherwise noted, all reagents were obtained or are available from Aldrich Chemical Co., Milwaukee, Wis., or may be synthesized by known methods.

TABLE 1

Materials used in the examples

| Material | Description |
| --- | --- |
| PPT 8667 | 0.028" thick Polyurethane Protective Tape with 0.003" of acrylic adhesive available from 3M Company, St. Paul, MN. Color 36173 gray |
| PPT 8542 | 0.020" thick black Polyurethane Protective Film, this is commercially available in tape form with an acrylic adhesive from 3M Company, St. Paul, MN |
| Gray Pigment | Gray pigmented polyurethane per Fed Std 595 color 36173 |
| Black Pigment | Black pigmented polyurethane |
| Krystalgran PN3429-108 | Thermoplastic polyurethane available from Huntsman Corporation, The Woodlands, TX |
| CN9893 | Aliphatic Urethane Acrylate Oligomer available from Sartomer Company, Exton, PA |
| Pre-preg | 250° F. cure (121° C.) epoxy prepreg, Hexcel F155 |

Film Extrusion

Film extrusion was performed on a 58 mm Davis Standard, co-rotating twin screw extruder. It has a L/D ratio of approximately 84:1 and extrudes through a 26 inch wide die. The films were corona-treated with an on-line corona treatment apparatus.

The samples were cast onto a matte paper casting liner. The casting liner had a polyester tape adhered to the backside to prevent the polyurethane from sticking to it and splitting the paper when unwound. Table 2 shows the component feed rates for the samples.

TABLE 2

Extrusion Rates

| Sample | Krystalgran PN3429-108 (lb/hr) | Pigment (lb/hr) | CN9893 (lb/hr) | Line Rate (ft/min) |
| --- | --- | --- | --- | --- |
| Example 1 Film | 130.5 | 4.5 (gray) | 16.7 | 7.5 |
| Example 2 Film | 130.5 | 4.5 (black) | 14.9 | 7.5 |

The polyurethane and pigments were fed separately by Ktron gravimetric feeders. The CN9893 was fed from a heated pressure vessel. The pressure vessel held 15 gallons and was made of stainless steel. It was heated by wrapping with a heat blanket. The temperature of the heat blanket was set to 170° F. The pot was pressurized to 60 psi with air and the flowrate was controlled manually with a needle valve. The pot was placed on a weigh scale, enabling consistent monitoring of the flowrate/weight loss.

The rolls were extruded to 26" wide and 0.024" thick. Approximately 200 yards of each were collected.

E-Beam Treatment

The polyurethane rolls were ebeam irradiated. Due to the thickness of the films and the voltage limitation of the ebeam unit (260 kV max), the samples were passed through the ebeam twice in order to irradiate the samples from both sides. Table 3 summarizes the ebeam conditions for the samples.

TABLE 3

Ebeam Conditions

| Sample | Dose (MRAD) | Voltage (kV) | Current (mA) | Line Speed (ft/min) |
| --- | --- | --- | --- | --- |
| Example 1 Film | 16 | 260 | 75 | 100 |
| Example 2 Film | 16 | 260 | 75 | 100 |

After ebeam exposure, the samples had become semi-IPN polyurethanes with the acrylate forming a crosslinked network inside the thermoplastic polyurethane. To validate this, all samples were heated to 300° F. for 30 minutes and did not become glossy. If the network had not been formed, the films would have become glossy. They were also all tested by placing a strip in front of a heat gun. The samples did not melt, indicating the network had formed.

Coating with Adhesive

The samples were coated with a 90/10 isooctyl acrylate/acrylic acid monomer mixture with photoinitiator at a coating thickness of 3 mil (0.076 mm), and then UV cured to form a pressure sensitive acrylic adhesive.

Rain Erosion Simulator

A schematic of the apparatus used to test for rain erosion resistance is shown in FIG. 1. This apparatus is outlined in detail in 3M patent filing "METHOD OF TESTING LIQUID DROP IMPACT AND APPARATUS," U.S. patent application Ser. No. 11/680,784 filed Mar. 1, 2007.

The testing apparatus of FIG. 1 was assembled using a 0.177 caliber air gun ("Drozd Air Gun", European American Armory Corporation, Cocoa, Fla.) and ½ inch diameter polyvinyl chloride tube as the barrel section. 4.5 mm Grade II acetate pellets (Engineering Laboratories, Inc, Oakland, N.J.) are propelled through use of the pellet gun which is connected to a tank of compressed nitrogen (Oxygen Service Company, St. Paul, Minn.) set at about 60 psi. Samples are continuously coated with a stream of water delivered through use of a water pump (Part No. 23609-170, VWR, West Chester, Pa.). Velocity of the pellets was measured with a CED Millennium Chronograph, available from Competitive Edge Dynamics LLC, Orefield, Pa.

The samples were tested by cutting a circle with a 6.1 cm diameter and a 2.2 cm diameter hole in the middle and adhering this to a round 304 stainless steel plate having an outer diameter of 7.6 cm and a central hole with a diameter of 0.35 cm. The samples were allowed to dwell on the substrate for 24 hours before testing. The tests were conducted at a shot rate of 3 shots/sec. The test results are shown in Table 4.

TABLE 4

Simulated Rain Erosion Test Results

| Sample | Average Velocity (ft/s) | Average Shots to Failure |
| --- | --- | --- |
| Example 1 Film | 361.7 | 371.3 |
| Example 2 Film | 363.3 | 372.3 |
| Comparative Example 3C (PPT 8667) | 361.5 | 245.0 |

As evident by a higher "Shots to Failure" the Example 1 and 2 films were shown to be more durable than PPT 8667, Comparative Example 3C. The Example 1 and 2 films were semi-IPN polyurethane, while the Comparative Example 3C film (PPT 8667) was a thermoplastic polyurethane of the same thickness.

Co-Cure

This example shows the ability of a semi-IPN polyurethane to be able to be co-cured into a composite structure. This enabled the film to be adhered into the composite without the need for pressure sensitive adhesives. It is possible with a semi-IPN polyurethane because the crosslinked network prevents the film from melting and flowing during the curing process.

The following procedure was used to demonstrate the ability to co-cure into a composite at elevated temperatures. A 2.5 inch long aluminum airfoil coupon was used as a tool. On top of the tool was placed a release liner. Stacked on top of the release liner were 8 layers of pre-preg arranged in a 0°-90°-0° criss-cross configuration. The pre-preg layers were all cut into 2.5"×3.5" squares. On top of the pre-preg was placed a 1.25"×3.5" sample of Example 1 film with no adhesive (as made in the previous example) side by side with a 1.25"×3.5" sample of PPT 8542 (no adhesive), designated Example 4C. Another release liner was placed on top of the polyurethanes. The construct was placed on a vacuum table and covered with a rubber mat. Vacuum was pulled on the construct, sucking the rubber mat to the composite. The vacuum table was heated to 250° F. over the course of ten minutes. When the table reached 250° F., it was held at that temperature for an additional 10 minutes. The heat was turned off and vacuum remained on for an additional 5 minutes to help cool the table. After this, the composite was removed and inspected.

Figure 2:
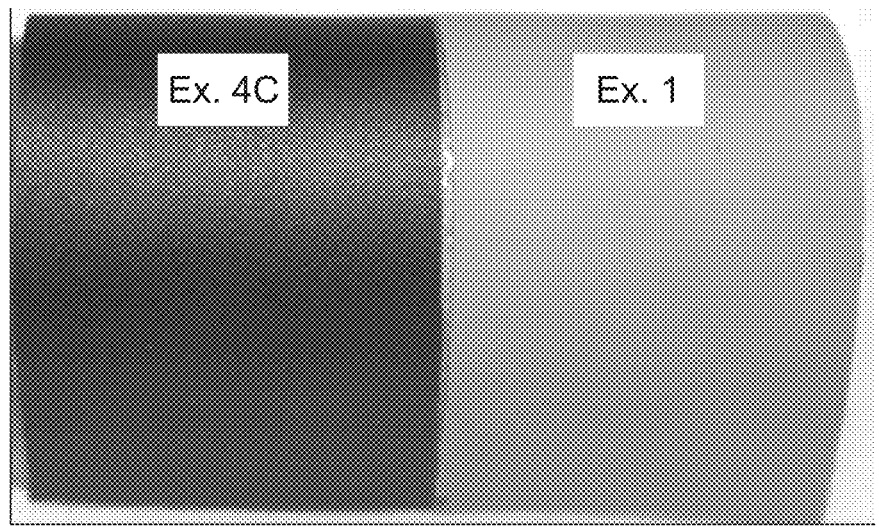
FIG. 2 is a photograph of Example 1 film and Example 4C film (comparative) on a substrate prior to testing as described in the Examples.
Figure 3:
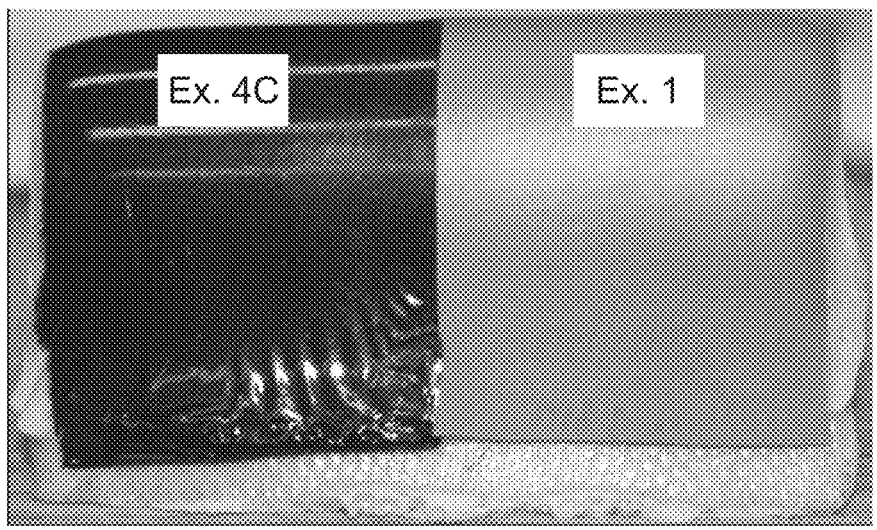
FIG. 3 is a photograph of Example 1 film and Example 4C film (comparative) on a substrate after testing as described in the Examples.

FIGS. 2 and 3 are photographs of the Example 1 and 4C films before and after testing. The black Comparative Example 4C film became glossy as the polyurethane melted. The melting of the Example 4C polyurethane also caused it to flow down as the vacuum sucked the rubber mat down and squeezed the polyurethane towards the base. This left a thin layer of the Example 4C film on the top of the coupon and a thicker, wrinkled film towards the base. The Example 1 film became slightly more glossy, but still maintained its matte appearance. It molded to the composite without melting or flowing.

Various modifications and alterations of this invention will become apparent to those skilled in the art without departing from the scope and principles of this invention, and it should be understood that this invention is not to be unduly limited to the illustrative embodiments set forth hereinabove.

We claim:

1. A method of making a part comprising the steps of:
    a) lining a mold with a film or tape which comprises a semi-interpenetrating network (semi-IPN) of:
        i) a crosslinked component derived from a urethane acrylate and
        ii) a non-crosslinked component which is a thermoplastic polyurethane; and
    b) performing a molding process such that after the molding process the resulting part has an outer surface of the film or tape.

2. The method according to claim 1 wherein the molded part comprises a molded material selected from the group consisting of thermoplastic polymers, thermoset polymers, curable polymers, composites, fiberglass, ceramics and clays.

3. The method according to claim 2 wherein the molded material is a resin matrix composite material.

4. The method according to claim 2 wherein the molded material is a fiber reinforced resin matrix composite material.

5. The method according to claim 1 wherein the molded part comprises a molded material and wherein the molding process comprises curing the molded material.

6. The method according to claim 1 wherein the molded part comprises a molded material and wherein the molding process comprises heat cure of the molded material.

7. The method according to claim 6 wherein the molded material is a resin matrix composite material.

8. The method according to claim 6 wherein the molded material is a fiber reinforced resin matrix composite material.

9. The method according to claim 1, wherein the urethane acrylate is at least partially miscible in the thermoplastic polyurethane.

* * * * *

UNITED STATES PATENT AND TRADEMARK OFFICE
CERTIFICATE OF CORRECTION

PATENT NO.         : 9,718,242 B2
APPLICATION NO.    : 14/558431
DATED              : August 1, 2017
INVENTOR(S)        : Ryan Marx Page 1 of 1

It is certified that error appears in the above-identified patent and that said Letters Patent is hereby corrected as shown below:

On the Title Page

Column 1 Under (72) Inventors:
Line 1, delete "Ryan F. Marx" and insert -- Ryan E. Marx --, therefor.

Column 1 Under (Related U.S. Application Data):
Line 1, delete "Continuation-in-part" and insert -- Divisional --, therefor.

In the Specification

Column 2
Line 43, after "reference:" insert -- Attorney Docket No. 63528US002, --.

Column 6
Line 27, after "APPARATUS,"" insert -- Attorney Docket No. 62547US002, --.

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*